United States
Yamashita

[11] 3,976,366
[45] Aug. 24, 1976

[54] RETROFOCUS-TYPE ULTRA-WIDE ANGLE PHOTOGRAPHIC LENS SYSTEM

[75] Inventor: Nobuo Yamashita, Tama, Japan

[73] Assignee: Olympus optical Co., Ltd., Tokyo, Japan

[22] Filed: Aug. 20, 1974

[21] Appl. No.: 499,024

[30] Foreign Application Priority Data
Aug. 21, 1973 Japan............................. 48-93654

[52] U.S. Cl................................. 350/214; 350/176
[51] Int. Cl.²......................................... G02B 9/64
[58] Field of Search........................... 350/214, 176

[56] References Cited
UNITED STATES PATENTS
3,512,874   5/1970   Woltche............................ 350/214
3,830,559   8/1974   Matsubara......................... 350/214
3,832,037   8/1974   Nakagawa.......................... 350/214

*Primary Examiner*—Paul A. Sacher
*Attorney, Agent, or Firm*—Cushman, Darby & Cushman

[57] ABSTRACT

A retrofocus-type ultra-wide angle photographic lens system having a front negative lens group comprising one or two positive meniscus lenses and three or four negative meniscus lenses and satisfying the following conditions:

$$0.4f < |f_{1234}| << 0.8f, \quad f_{1234} < 0 \qquad (1)$$

$$r_a > |r_b|, \quad r_b < 0 \qquad (2)$$

$$0.3f < D_5 < 1.3f \qquad (3)$$

$$0.15f < D_6 < 0.65f \qquad (4)$$

Said photographic lens system has a front lens of small diameter, large back focal length and aberrations corrected quite favorably.

11 Claims, 25 Drawing Figures

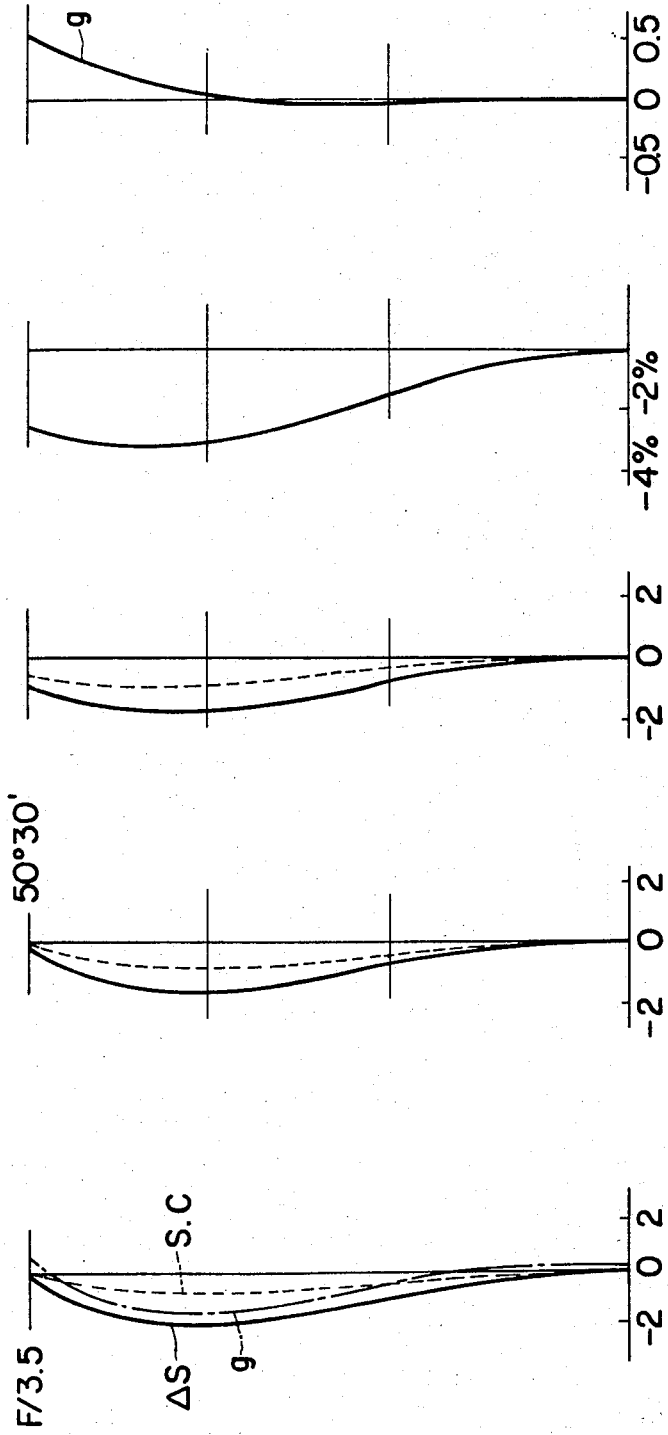

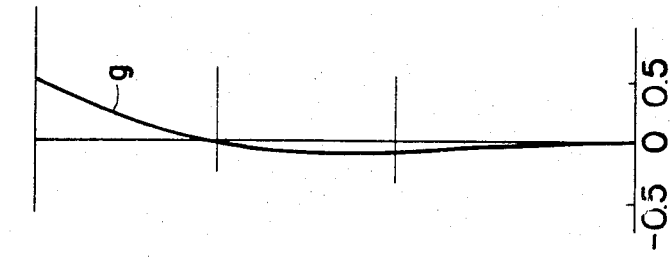
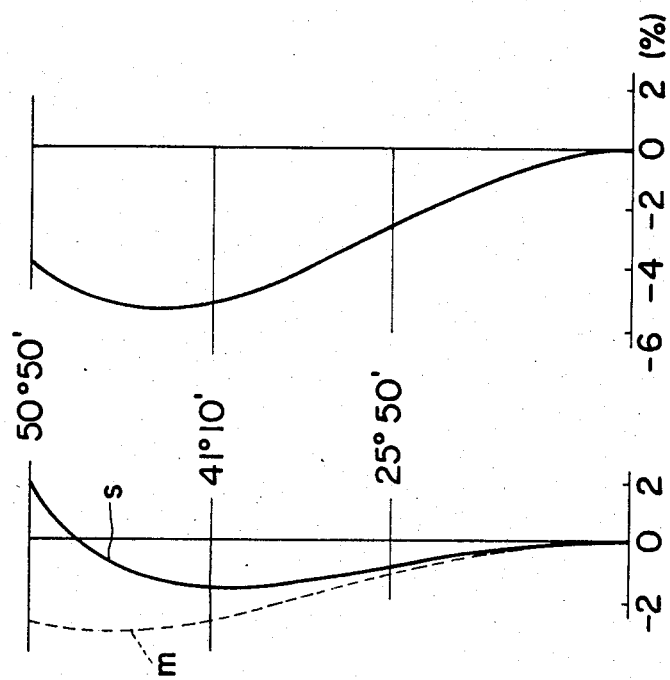
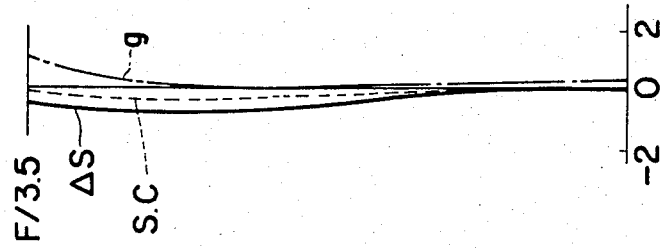

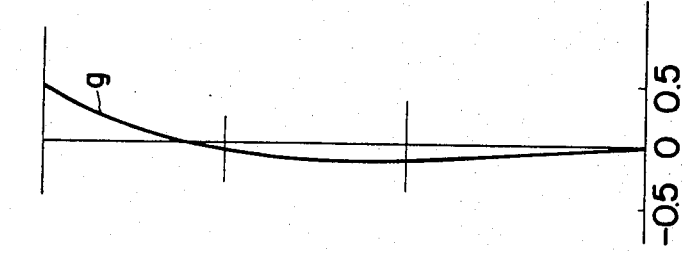
FIG. 8a SPHERICAL ABERRATION
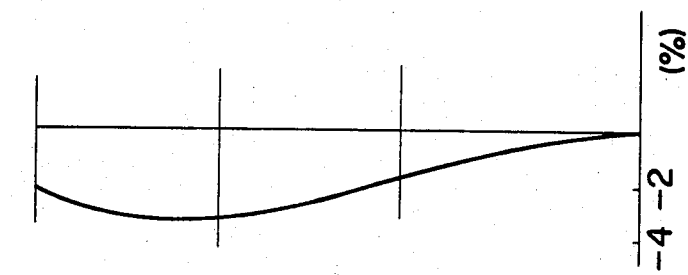
FIG. 8b ASTIGMATISM
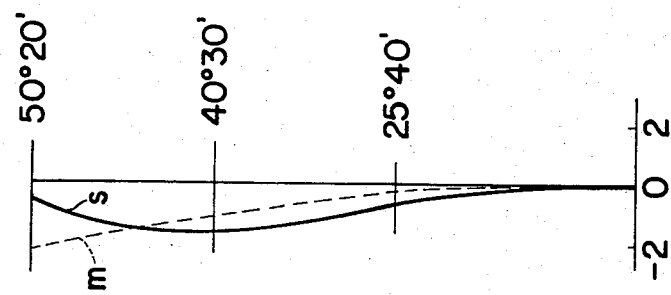
FIG. 8c DISTORTION
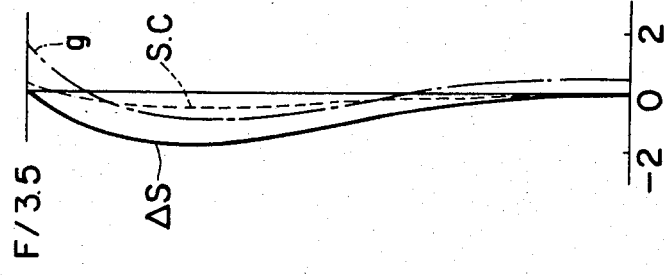
FIG. 8d LATERAL CHROMATIC ABERRATION

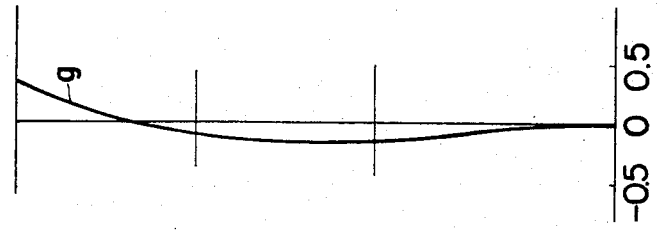
FIG. 9d LATERAL CHROMATIC ABERRATION
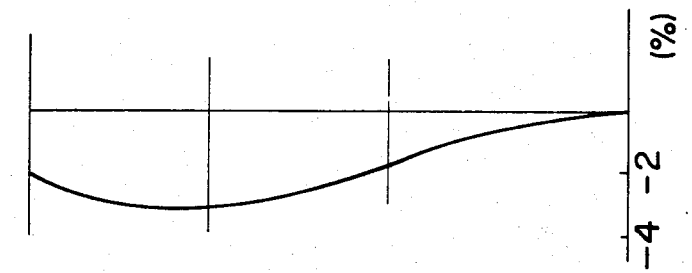
FIG. 9c DISTORTION
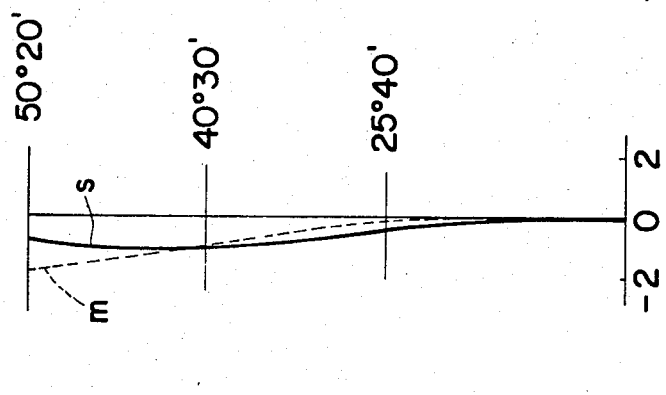
FIG. 9b ASTIGMATISM
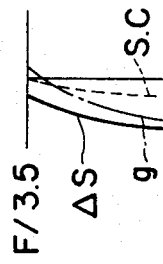
FIG. 9a SPHERICAL ABERRATION

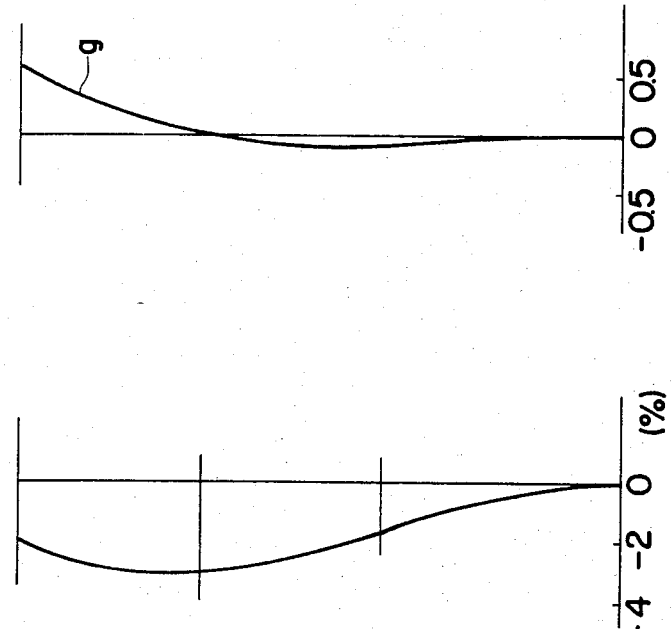
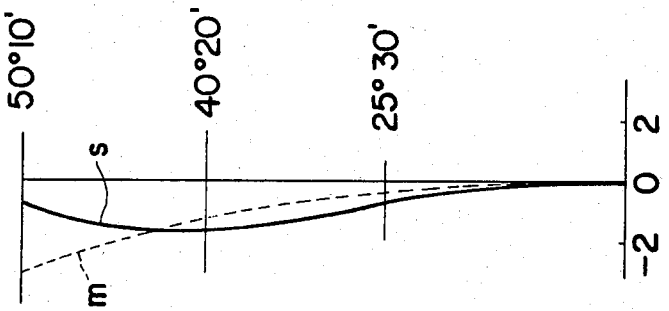
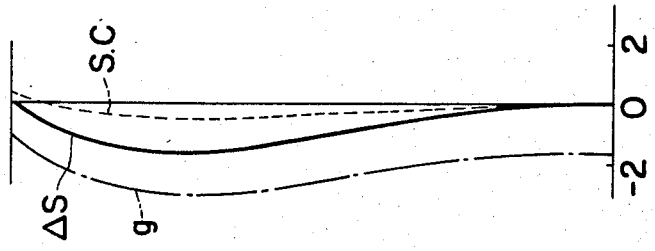

3,976,366

RETROFOCUS-TYPE ULTRA-WIDE ANGLE PHOTOGRAPHIC LENS SYSTEM

BACKGROUND OF THE INVENTION a. Field of the Invention

The present invention relates to a ultra-wide angle photographic lens system to be used with single-lens reflex cameras and, more particularly, to a retrofocus-type photographic lens system of F/3.5 attaining a wide field angle of 100°.

b. Description of the Prior Art

For ulra-wide angle photographic lens systems for single-lens reflex cameras, it is necessary to make the back focal lens long in order to avoid "mirror-up" and, when the focal length of the lens system as a whole is represented by reference symbol $f$, the back focal length has to be made $2f$ or more. Besides, in this kind of lens systems, there is a tendency that the front lens diameter becomes large. When, however, the front lens diameter is large, an inconvenience occurs because it is necessary to use filters of large diameters exclusively for that lens system. To eliminate the above-mentioned inconvenience, it is desirable that the front lens diameter is small. Besides, in retrofocus-type lens systems in which a front lens group is arranged as a negative lens group and a rear lens group is arranged as a positive lens group, the lens system is asymmetrical. Consequently, when the field angle becomes wider, there is a tendency that distortion of higher degree and lateral chromatic aberration are caused.

SUMMARY OF THE INVENTION

It is, therefore, an object of the present invention to provide a ultra-wide angle photograhic lens system having a long back focal length and small front lens diameter for which aberrations are corrected favourably.

To attain a long back focal length, which is the above-mentioned object, in retrofocus-type lens systems, it is necessary to make the power of the front negative lens group strong or to make the airspace between the front and rear lens groups long. When, however, the front lens diameter and field angle are decided, the position of the entrance pupil is also decided. Therefore, when the airspace between the front and rear lens groups is made longer after deciding the front lens diameter and field angle, in retrofocus-type lens systems, the distance from the position of the entrance pupil to the position of the stop becomes longer and it becomes necessary to make the power of the front ngative lens group stronger. From the above, the power of the front negative lens group has to be made stronger than $1/0.8f$. When, however, the power of the front negative lens group is made stronger, negative distortion and lateral chromatic aberration are caused and it is not desirable. Therefore, in the lens system according to the present invention, the front negative lens group is arranged by one or two positive meniscus lenses and three or four negative meniscus lenses. By said three or four negative meniscus lenses, inclination of the principal ray in respect to the optical axis is reduced gradually in order to minimize negative distortion and lateral chromatic aberration. If the number of negative meniscus lenses in the front lens group is two or less, considerable negative distortion will be caused. In this case, it may be possible to correct negative distortion by positive meniscus lenses in said front lens group. If, however, that method is adopted, so-called aberrations of higher degree occur, i.e., overcorrection of aberrations at the portion of the largest field angle occurs, when aberrations at the zonal portion are corrected to optimum values. Consequently, it becomes difficult to favourably correct distortion and lateral chromatic aberration over the whole field angle. For the reason as mentioned in the above, it is desirable to make the number of negative meniscus lenses in the front lens group three or four.

The lens system according to the present invention arranged based on the above idea is as follows. That is, the front negative lens group of the lens system according to the present invention comprises a first lens component $L_1$ which comprises a single positive meniscus lens with its convex surface positioned on the object side or two positive meniscus lenses arranged by dividing said single positive meniscus lens into two lenses, a second lens component $L_2$ which is a negative meniscus lens, a third lens component $L_3$ which is also a negative meniscus lens, and a fourth lens component $L_4$ which comprises a single negative meniscus lens or two negative meniscus lenses arranged by dividing said single negative meniscus lens into two lenses. Besides, the rear lens group of the lens system according to the present invention comprises a fifth lens component $L_5$ which comprises a single positive lens or cemented positive doublet lens or divided positive lenses, a sixth lens component $L_6$ which comprises a single negative lens or cemented negative doublet lens, a seventh lens component $L_7$ which is a positive meniscus lens, and a eighth lens component $L_8$ which comprises a single positive meniscus or two positive meniscus lenses arranged by dividing said single positive meniscus lens into two lenses. Besides, the lens system according to the present invention satisfies the following conditions when reference symbol $f$ represents a focal length of the lens system as a whole, reference symbol $f_{1234}$ represents a total focal length of the first lens component $L_1$, second lens component $L_2$, third lens component $L_3$ and fourth lens component $L_4$, reference symbol $r_a$ represents a radius of curvature of the lens surface of the fifth lens component $L_5$ which is positioned nearest the object, reference symbol $r_b$ represents a radius of curvature of the lens surface of the said fifth lens component $L_5$ which is positioned nearest the image, reference symbol $D_5$ represents a distance from said surface $r_a$ to surface $r_b$, and reference symbol $D_6$ represents a thickness of the sixth lens component $L_6$.

$$0.4f < |f_{1234}| < 0.8f, f_{1234} < 0 \quad (1)$$

$$r_a > |r_b|, r_b < 0 \quad (2)$$

$$0.3f < D_5 < 1.3f \quad (3)$$

$$0.15f < D_6 < 0.65f \quad (4)$$

In the lens system according to the present invention described in the above, the total focal length $f_{1234}$ of the front negative lens group is selected as defined by the condition (1) for the purpose of making the front lens diameter small and making the back focal length long as described in the above. That is, when $f_{1234}$ exceeds the upper limit in the condition (1), it becomes difficult to make the front diameter small and to make the back focal length long. If $f_{1234}$ becomes smaller than the lower limit of the condition (1), negative distortion occurs and it becomes very difficult to favourably correct said negative distortion by three or four negative meniscus lenses in the second lens component $L_2$ through the fourth lens component $L_4$. If it is attempted to correct said negative distortion by the positive meniscus lens of the first lens component $L_1$, aberrations of higher degree occur which is not desirable. Referring to the condition (2), the radius of curvature $r_a$ of the surface of the fifth lens component $L_5$ nearest the object and the radius of curvature $r_b$ of the surface of said fifth lens component $L_5$ nearest the image are selected as $r_a > |r_b|$. This is for the purpose of making the back focal length long and favourably correcting spherical aberration. Besides, if the distance $D_5$ from said surface $r_a$ to surface $r_b$ is larger than $1.3f$, the distance from the front negative lens group to the stop becomes longer and the front lens diameter becomes necessarily larger. To make the front lens diameter small in that case, it becomes necessary to make the power of the front negative lens group stronger. It is, however, not desirable because distortion and lateral chromatic aberration will occur as described in the above. When, on the contrary, $D_5$ is smaller than $0.3f$, it becomes impossible to make the back focal length long. It may be considered to make the power of the front negative lens group stronger for the purpose of making the back focal length long. But, this is not desirable because spherical aberration becomes extremely unfavourable. For reasons as mentioned in the above, it is necessary to select $D_5$ as shown by the condition (3). Finally, as for the thickness $D_6$ of the sixth lens component $L_6$, the condition (4) is established for the following reason. That is, when $D_6$ is larger than $0.65f$, the back focal length can be made long. But, positions of the seventh lens component $L_7$ and eighth lens component $L_8$ become distant from the stop and, consequently, negative distortion and negative lateral chromatic aberration become considerably large and it becomes difficult to use the lens system actually. When, on the other hand, $D_6$ is smaller than $0.15f$, it becomes difficult to make the back focal length long. To make the back focal length long in that case, it is necessary to make the power of the front negative lens group strong or to make the distance between surfaces $r_a$ and $r_b$ in the fifth lens component $L_5$ long. However, these are not desirable because distortion and lateral chromatic aberration are caused in either case. Therefore, it is necessary to select $D_6$ within the range shown by the condition (4).

The lens system according to the present invention arranged as mentioned in the above and satisfying the above-mentioned conditions is capable of attaining the object of the present invention. For said lens system according to the present invention, it is more desirable to select the radius of curvature $r_a$ of the surface of the fifth lens component $L_5$ positioned nearest the object within the range defined by the following condition.

$$f < r_a < 6f \qquad (5)$$

If $r_a$ exceeds the upper limit in the above condition (5), the astigmatic difference becomes large. If $r_a$ becomes smaller than the lower limit in the condition (5), it becomes impossible to make the back focal length long and spherical aberration becomes large.

BRIEF EXPLANATION OF THE DRAWINGS

FIGS. 6a, 6b, 6c, 6d, 7a, 7b, 7c, 7d, 8a, 8b, 8c, 8d, 9a, 9b, 9c, 9d, 10a, 10b, 10c and 10d respectively show graphs illustrating aberration curves of respective embodiments of the lens system according to the present invention.

DETAILED DESCRIPTION OF THE PREFERRED EMBODIMENTS

Preferred embodiments of the lens system according to the present invention explained in the above are as shown below.

Figure 1:
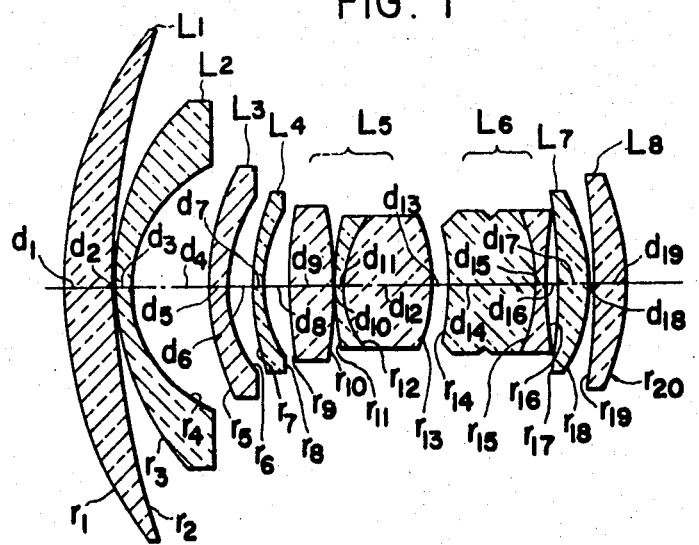
FIGS. 1 through 5 respectively show sectional views of respective embodiments of the retrofocus-type ultra-wide angle photographic lens system according to the present invention.

| Embodiment 1 (Refer to Fig. 1.) | | | |
|---|---|---|---|
| $r_1 = 190.75$ | $d_1 = 24.59$ | $n_1 = 1.6779$ | $\nu_1 = 55.33$ |
| $r_2 = 338.60$ | $d_2 = 0.55$ | | |
| $r_3 = 166.61$ | $d_3 = 8.20$ | $n_2 = 1.7859$ | $\nu_2 = 44.24$ |
| $r_4 = 58.66$ | $d_4 = 35.08$ | | |
| $r_5 = 109.84$ | $d_5 = 8.20$ | $n_3 = 1.7859$ | $\nu_3 = 44.24$ |
| $r_6 = 58.41$ | $d_6 = 10.93$ | | |
| $r_7 = 107.90$ | $d_7 = 5.46$ | $n_4 = 1.7859$ | $\nu_4 = 44.24$ |
| $r_8 = 61.18$ | $d_8 = 10.93$ | | |
| $r_9 = 203.49$ | $d_9 = 20.55$ | $n_5 = 1.59551$ | $\nu_5 = 39.21$ |
| $r_{10} = -390.66$ | $d_{10} = 0.82$ | | |
| $r_{11} = 204.50$ | $d_{11} = 5.46$ | $n_6 = 1.6968$ | $\nu_6 = 55.62$ |
| $r_{12} = 48.75$ | $d_{12} = 39.12$ | $n_7 = 1.5927$ | $\nu_7 = 35.54$ |
| $r_{13} = -73.14$ | $d_{13} = 8.74$ | | |
| $r_{14} = -131.43$ | $d_{14} = 39.34$ | $n_8 = 1.8074$ | $\nu_8 = 35.43$ |
| $r_{15} = -70.21$ | $d_{15} = 5.46$ | $n_9 = 1.84666$ | $\nu_9 = 23.88$ |
| $r_{16} = 326.17$ | $d_{16} = 4.37$ | | |
| $r_{17} = -364.77$ | $d_{17} = 14.59$ | $n_{10} = 1.618$ | $\nu_{10} = 63.38$ |
| $r_{18} = -78.24$ | $d_{18} = 0.82$ | | |
| $r_{19} = -485.85$ | $d_{19} = 15.57$ | $n_{11} = 1.618$ | $\nu_{11} = 63.38$ |
| $r_{20} = -116.31$ | | | |
| $f = 100$ | | | |
| $f_B = 203.33$ | | | |
| $f_{1234} = -58.435$ | | | |
| $D_5 = 65.95$ | | | |
| $D_6 = 44.8$ | | | |

In the above, reference symbols $r_1$ through $r_{20}$ respectively represent radii of curvature of respective lens surfaces, reference symbols $d_1$ through $d_{19}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

In the above embodiment 1, the first lens component $L_1$ is a single positive meniscus lens, the fourth lens component $L_4$ is a single negative meniscus lens, the fifth lens component $L_5$ comprises a single lens and cemented doublet lens, the sixth lens component $L_6$ is a cemented doublet lens and the eighth lens component $L_8$ is a single positive meniscus lens. Besides, in said embodiment 1, the surface $r_a$ corresponds to the surface $r_9$, the surface $r_b$ corresponds to the surface $r_{13}$, and $D_5$ and $D_6$ are respectively $D_5 = d_9 + d_{10} + d_{11} + d_{12}$, and $D_6 = d_{14} + d_{15}$. In this embodiment, it is desirable to select the airspace $d_4$ between the second lens component $L_2$ and third lens component $L_3$ within the range of $0.25f < d_4 < 0.8f$. If $d_4$ exceeds the upper limit of the above range, the front lens diameter and overall length of the lens system becomes large. If $d_4$ is smaller than the lower limit of the above range, it becomes substantially impossible to favourably correct aberrations of the lens system, by moving a pre-determined lens or lens group, said aberrations being aggravated especially in close-up photographing.

Besides, if Abbe's numbers of respective lenses of the cemented doublet lenses in the fifth lens component $L_5$ and sixth lens component $L_6$ are selected as $\nu_6 > \nu_7$ and $\nu_8 > \nu_9$, it is more desirable for favourably correcting lateral chromatic aberration.

Aberration curves of the embodiment 1 are shown in FIGS. 6a, 6b, 6c and 6d.

Figure 2:
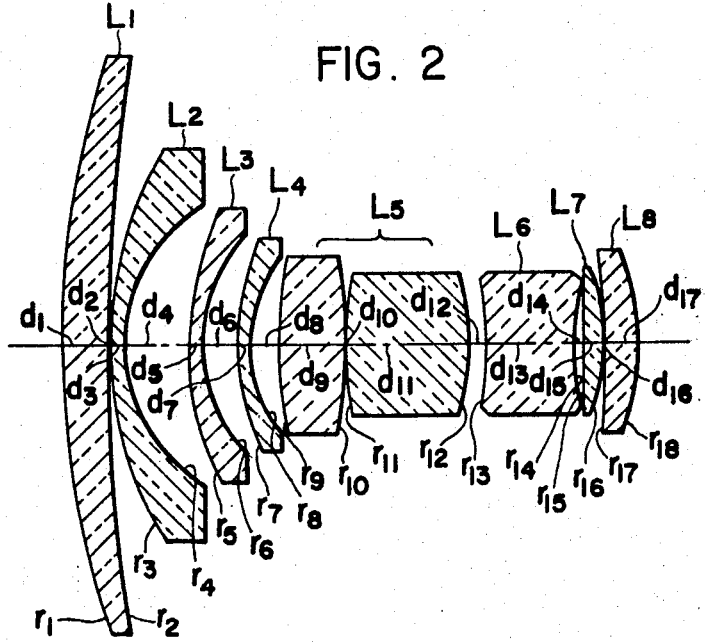

Embodiment 2 (Refer to Fig. 2.)

| | | | |
|---|---|---|---|
| $r_1 = 402.74$ | | | |
| | $d_1 = 21.86$ | $n_1 = 1.72$ | $\nu_1 = 42.08$ |
| $r_2 = 897.45$ | | | |
| | $d_2 = 0.55$ | | |
| $r_3 = 170.35$ | | | |
| | $d_3 = 8.20$ | $n_2 = 1.618$ | $\nu_2 = 63.38$ |
| $r_4 = 74.51$ | | | |
| | $d_4 = 27.32$ | | |
| $r_5 = 132.12$ | | | |
| | $d_5 = 6.56$ | $n_3 = 1.713$ | $\nu_3 = 53.98$ |
| $r_6 = 71.90$ | | | |
| | $d_6 = 16.39$ | | |
| $r_7 = 120.35$ | | | |
| | $d_7 = 5.46$ | $n_4 = 1.713$ | $\nu_4 = 53.98$ |
| $r_8 = 62.65$ | | | |
| | $d_8 = 13.66$ | | |
| $r_9 = 218.55$ | | | |
| | $d_9 = 30$ | $n_5 = 1.5927$ | $\nu_5 = 35.54$ |
| $r_{10} = -278.53$ | | | |
| | $d_{10} = 0.82$ | | |
| $r_{11} = 436.34$ | | | |
| | $d_{11} = 56.01$ | $n_6 = 1.5927$ | $\nu_6 = 35.54$ |
| $r_{12} = -99.36$ | | | |
| | $d_{12} = 8.74$ | | |
| $r_{13} = -105.49$ | | | |
| | $d_{13} = 40.77$ | $n_7 = 1.80518$ | $\nu_7 = 25.43$ |
| $r_{14} = 242.14$ | | | |
| | $d_{14} = 2.73$ | | |
| $r_{15} = 1535.19$ | | | |
| | $d_{15} = 9.13$ | $n_8 = 1.618$ | $\nu_8 = 63.38$ |
| $r_{16} = -95.99$ | | | |
| | $d_{16} = 0.82$ | | |
| $r_{17} = 852.91$ | | | |
| | $d_{17} = 15.57$ | $n_9 = 1.64$ | $\nu_9 = 60.25$ |
| $r_{18} = -108.58$ | | | |
| | $f = 100$ | | |
| | $f_B = 202.18$ | | |
| | $f_{1234} = -69.38$ | | |
| | $D_5 = 86.83$ | | |
| | $D_6 = 40.77$ | | |

In the above, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_9$ respectively represent refractive indexes of respective lenses, reference symbols $\nu_1$ through $\nu_9$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

Besides, in the embodiment 2, the sum of Abbe's numbers of respective lenses in the fifth lens component $L_5$ and sixth lens component $L_6$ is selected within the range of $\nu_5 + \nu_6 + \nu_7 < 130$, and this is desirable for favourable correction of lateral chromatic aberration.

Aberration curves of the embodiment 2 are shown in FIGS. 7a, 7b, 7c and 7d.

Figure 3:
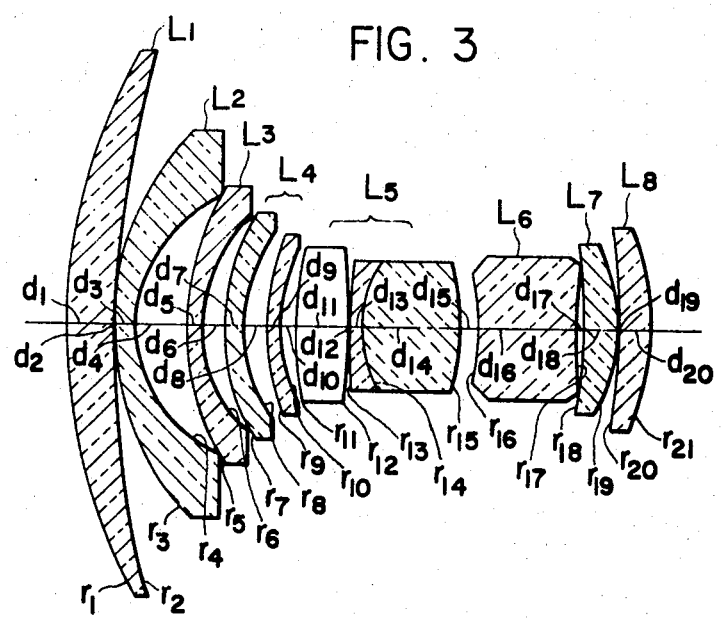

Embodiment 3 (Refer to FIG. 3.)

| | | | |
|---|---|---|---|
| $r_1 = 242.62$ | | | |
| | $d_1 = 21.86$ | $n_1 = 1.6935$ | $\nu_1 = 50.81$ |
| $r_2 = 417.07$ | | | |
| | $d_2 = 0.55$ | | |
| $r_3 = 125.42$ | | | |
| | $d_3 = 8.20$ | $n_2 = 1.64$ | $\nu_2 = 60.25$ |
| $r_4 = 62.58$ | | | |
| | $d_4 = 22.79$ | | |
| $r_5 = 104.56$ | | | |
| | $d_5 = 8.20$ | $n_3 = 1.67$ | $\nu_3 = 57.33$ |
| $r_6 = 64.10$ | | | |
| | $d_6 = 11.38$ | | |
| $r_7 = 100.38$ | | | |
| | $d_7 = 8.20$ | $n_4 = 1.713$ | $\nu_4 = 53.89$ |
| $r_8 \ 67.32$ | | | |
| | $d_8 = 9.95$ | | |
| $r_9 = 101.93$ | | | |
| | $d_9 = 5.47$ | $n_5 = 1.713$ | $\nu_5 = 53.89$ |
| $r_{10} = 69.36$ | | | |
| | $d_{10} = 9.57$ | | |
| $r_{11} = 159.73$ | | | |
| | $d_{11} = 23.39$ | $n_6 = 1.69895$ | $\nu_6 = 30.12$ |
| $r_{12} = -348.08$ | | | |
| | $d_{12} = 0.82$ | | |
| $r_{13} = 426.77$ | | | |
| | $d_{13} = 5.47$ | $n_7 = 1.804$ | $\nu_7 = 46.57$ |
| $r_{14} = 47.22$ | | | |
| | $d_{14} = 45.11$ | $n_8 = 1.62374$ | $\nu_8 = 47.10$ |
| $r_{15} = -72.21$ | | | |
| | $d_{15} = 8.75$ | | |
| $r_{16} = -111.52$ | | | |
| | $d_{16} = 44.94$ | $n_9 = 1.84666$ | $\nu_9 = 23.88$ |
| $r_{17} = 464.87$ | | | |
| | $d_{17} = 3.28$ | | |
| $r_{18} = -278.28$ | | | |
| | $d_{18} = 14.59$ | $n_{10} = 1.618$ | $\nu_{10} = 63.38$ |
| $r_{19} = -80.52$ | | | |
| | $d_{19} = 0.82$ | | |
| $r_{20} = 533.62$ | | | |
| | $d_{20} = 15.58$ | $n_{11} = 1.618$ | $\nu_{11} = 63.38$ |
| $r_{21} = -110.31$ | | | |
| | $f = 100$ | | |
| | $f_B = 202.175$ | | |
| | $f_{1234} = -66.709$ | | |
| | $D_5 = 74.79$ | | |
| | $D_6 = 44.94$ | | |

In the above, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

In the above embodiment 3, the first lens component $L_1$ is a single positive meniscus lens, the fourth lens component $L_4$ comprises two negative meniscus lenses, the fifth lens component $L_5$ comprises a single lens and cemented doublet lens, the sixth lens component $L_6$ is a single lens, and the eighth lens component $L_8$ is a single positive meniscus lens. Besides, in said embodiment 3, the surface $r_a$ corresponds to the surface $r_{11}$, the surface $r_b$ corresponds to the surface $r_{15}$, and $D_5$ and $D_6$ are respectively $D_5 = d_{11} + d_{12} + d_{13} + d_{14}$, and $D_6 = d_{16}$.

Furthermore, in the embodiment 3, the sum of Abbe's numbers of the single lens in the fifth lens component $L_5$ and of the sixth lens component $L_6$ is selected within the range of $\nu_6 + \nu_9 < 85$ in order to more favourably correct lateral chromatic aberration.

Aberration curves of the embodment 3 are shown in FIG. 8a, 8b, 8c and 8d.

the surface $r_b$ corresponds to the surface $r_{13}$, and $D_5$ and $D_6$ are respectively $D_5 = d_{11} + d_{12}$, and $D_6 = d_{14} + d_{15}$.

Furthermore, in the embodiment 4, Abbe's numbers of respective lenses of both cemented doublet lenses of the fifth lens component $L_5$ and sixth lens component $L_6$ are selected as $\nu_6 > \nu_7$ and $\nu_8 > \nu_9$. Thus, lateral chromatic aberration is corrected more favourably.

Aberration curves of the embodiment 4 are shown in FIGS. 9a, 9b, 9c and 9d.

Figure 4:
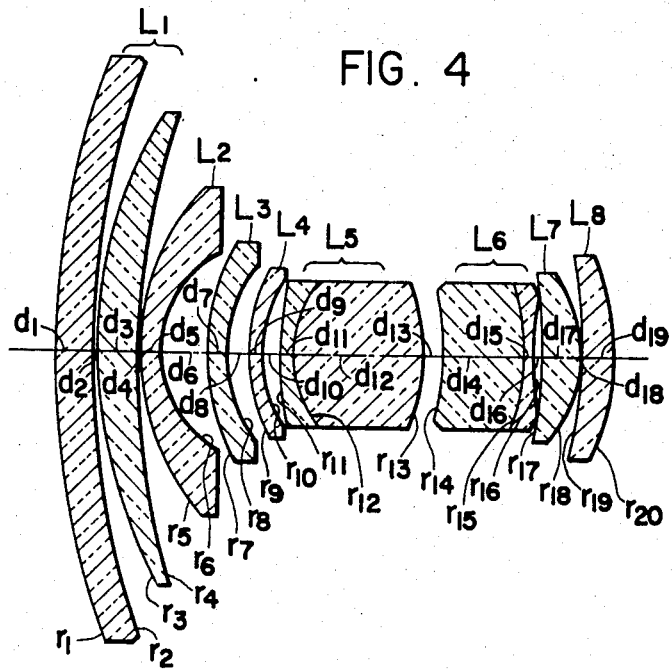

Embodiment 4 (Refer to Fig. 4.)

| | | | |
|---|---|---|---|
| $r_1 = 345.61$ | | | |
| | $d_1 = 17.48$ | $n_1 = 1.6935$ | $\nu_1 = 53.34$ |
| $r_2 = 381.0$ | | | |
| | $d_2 = 0.55$ | | |
| $r_3 = 202.12$ | | | |
| | $d_3 = 20.76$ | $n_2 = 1.64$ | $\nu_2 = 60.25$ |
| $r_4 = 372.24$ | | | |
| | $d_4 = 0.55$ | | |
| $r_5 = 112.77$ | | | |
| | $d_5 = 8.20$ | $n_3 = 1.804$ | $\nu_3 = 46.57$ |
| $r_6 = 51.04$ | | | |
| | $d_6 = 21.66$ | | |
| $r_7 = 94.28$ | | | |
| | $d_7 = 8.20$ | $n_4 = 1.804$ | $\nu_4 = 46.57$ |
| $r_8 = 60.69$ | | | |
| | $d_8 = 11.11$ | | |
| $r_9 = 81.57$ | | | |
| | $d_9 = 5.46$ | $n_5 = 1.804$ | $\nu_5 = 46.57$ |
| $r_{10} = 54.67$ | | | |
| | $d_{10} = 8.20$ | | |
| $r_{11} = 115.82$ | | | |
| | $d_{11} = 5.46$ | $n_6 = 1.804$ | $\nu_6 = 46.57$ |
| $r_{12} = 50.12$ | | | |
| | $d_{12} = 61.12$ | $n_7 = 1.5927$ | $\nu_7 = 35.54$ |
| $r_{13} = -74.21$ | | | |
| | $d_{13} = 8.74$ | | |
| $r_{14} = -202.01$ | | | |
| | $d_{14} = 37.76$ | $n_8 = 1.804$ | $\nu_8 = 46.57$ |
| $r_{15} = -92.86$ | | | |
| | $d_{15} = 5.46$ | $n_9 = 1.80518$ | $\nu_9 = 25.43$ |
| $r_{16} = 400.39$ | | | |
| | $d_{16} = 3.28$ | | |
| $r_{17} = -232.64$ | | | |
| | $d_{17} = 14.59$ | $n_{10} = 1.618$ | $\nu_{10} = 63.38$ |
| $r_{18} = -75.14$ | | | |
| | $d_{18} = 0.82$ | | |
| $r_{19} = -705.46$ | | | |
| | $d_{19} = 15.57$ | $n_{11} = 1.618$ | $\nu_{11} = 63.38$ |
| $r_{20} = -133.68$ | | | |
| | $f = 100$ | | |
| | $f_B = 202.16$ | | |
| | $f_{1234} = -63.166$ | | |
| | $D_5 = 66.58$ | | |
| | $D_6 = 43.22$ | | |

Figure 5:
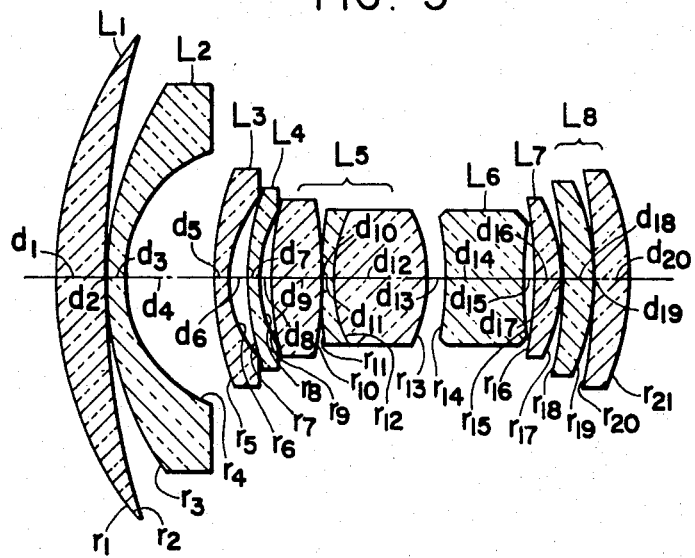

Embodiment 5 (Refer to Fig. 5.)

| | | | |
|---|---|---|---|
| $r_1 = 178.76$ | | | |
| | $d_1 = 21.74$ | $n_1 = 1.804$ | $\nu_1 = 46.57$ |
| $r_2 = 328.51$ | | | |
| | $d_2 = 0.54$ | | |
| $r_3 = 146.17$ | | | |
| | $d_3 = 8.15$ | $n_2 = 1.713$ | $\nu_2 = 53.89$ |
| $r_4 = 60.03$ | | | |
| | $d_4 = 40.06$ | | |
| $r_5 = 109.36$ | | | |
| | $d_5 = 8.15$ | $n_3 = 1.713$ | $\nu_3 = 53.89$ |
| $r_6 = 56.62$ | | | |
| | $d_6 = 8.23$ | | |
| $r_7 = 116.18$ | | | |
| | $d_7 = 5.43$ | $n_4 = 1.713$ | $\nu_4 = 53.89$ |
| $r_8 = 56.14$ | | | |
| | $d_8 = 6.80$ | | |
| $r_9 = 160.99$ | | | |
| | $d_9 = 21.24$ | $n_5 = 1.59551$ | $\nu_5 = 39.21$ |
| $r_{10} = -407.21$ | | | |
| | $d_{10} = 0.82$ | | |
| $r_{11} = 230.55$ | | | |
| | $d_{11} = 5.43$ | $n_6 = 1.804$ | $\nu_6 = 46.57$ |
| $r_{12} = -364.77$ | 62.57 | | |
| | $d_{12} = 42.45$ | $n_7 = 1.61659$ | $\nu_7 = 36.63$ |
| $r_{13} = -71.94$ | | | |
| | $d_{13} = 8.70$ | | |
| $r_{14} = -130.41$ | | | |
| | $d_{14} = 37.34$ | $n_8 = 1.80518$ | $\nu_8 = 25.43$ |
| $r_{15} = 323.41$ | | | |
| | $d_{15} = 3.26$ | | |
| $r_{16} = 270.88$ | | | |
| | $d_{16} = 12.50$ | $n_9 = 1.48606$ | $\nu_9 = 81.49$ |
| $r_{17}$ 32 $-73.41$ | | | |
| | $d_{17} = 0.82$ | | |
| $r_{18} = -292.45$ | | | |
| | $d_{18} = 14.13$ | $n_{10} = 1.48606$ | $\nu_{10} = 81.49$ |
| $r_{19} = -108.62$ | | | |
| | $d_{19} = 0.82$ | | |
| $r_{20} = -254.89$ | | | |
| | $d_{20} = 15.49$ | $n_{11} = 1.48606$ | $\nu_{11\ 1234} = 81.49$ |
| $r_{21} = -110.77$ | | | |
| | $f = 100$ | | |
| | $f_B = 202.23$ | | |
| | $f_{1234} = -55.406$ | | |
| | $D_5 = 69.94$ | | |
| | $D_6 = 37.34$ | | |

In the above, reference symbols $r_1$ $r_1$ through $r_{20}$ respectively represent radii of curvature of respective lens surfaces, reference symbols $d_1$ through $d_{19}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

In the above embodiment 4, the first lens component $L_1$ comprises two positive meniscus lenses, the fourth lens component $L_4$ is a single negative meniscus lens, the fifth lens component $L_5$ comprises a cemented doublet lens, the sixth lens component $L_6$ comprises a cemented doublet lens, and the eighth lens component $L_8$ is a single positive meniscus lens. In said embodiment 4, the surface $r_a$ corresponds to the surface $r_{11}$, In the above, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

In the above embodiment 5, the first lens component $L_1$ is a single positive meniscus lens, the fourth lens component $L_4$ is a single negative meniscus lens, the fifth lens component $L_5$ comprises a positive lens and cemented doublet lens, the sixth lens component $L_6$ is a single lens, and the eighth lens component $L_8$ comprises two positive meniscus lenses. In said embodiment 5, the surface $r_a$ corresponds to the surface $r_9$, the surface $r_b$ corresponds to the surface $r_{13}$, and $D_5$ and $D_6$ are respectively $D_5 = d_9 + d_{10} + d_{11} + d_{12}$, and $D_6 = d_{14}$.

Furthermore, the sum of Abbe's numbers of the single lens in the fifth lens component $L_5$ and of the sixth lens component $L_6$ is selected as $\nu_5 + \nu_8 < 85$, thus, lateral chromatic aberration is corrected more favourably.

Aberration curves of the embodiment 5 are shown in FIGS. 10a, 10b, 10c and 10d.

I claim:

1. A retrofocus-type ultra-wide angle photographic lens system comprising a first lens component having a positive power, a second lans component being a negative meniscus lens, a third lens component being a negative meniscus lens, a fourth lens component having a negative power, a fifth lens component having a positive power, a sixth lens component being a negative lens, a seventh lens component being a positive meniscus lens and an eighth lens component having a positive power, and said retrofocus-type ultra-wide angle photographic lens system satisfying the following conditions:

$[0.52f < |f_{1234}| < 0.73f, , f_{1234} < 0]$ $0.55f < |f_{1234}| < 0.70f, f_{1234} < 0$    (1)

$[r_a > |r_b|, r_b < 0]$ $2.2f > r_a > |r_b|, r_b < 0$    (2)

$[0.62f < D_5 < 0.91f]$ $0.65f < D_5 < 0.87f$    (3)

$[0.35f < D_6 < 0.47f]$ $0.37f < D_6 < 0.45f$    (4)

wherein reference symbol $f$ represents the focal length of the lens system as a whole, reference symbol $f_{1234}$ represents the total focal length of the first through fourth lens components, reference symbol $r_a$ represents the radius of curvature of the surface nearest the object of the fifth lens component, reference symbol $r_b$ represents the radius of curvature of the surface nearest the image of the fifth lens component, reference symbol $D_5$ represents the distance from the surface nearest the object to the surface nearest the image of the fifth lens component, reference $D_6$ represents the distance from the surface nearest the object to the surface nearest the image of the sixth lens component.

2. A retrofocus-type ultra-wide angle photographic lens system according to claim 1 in which said first lens component is a positive meniscus lens, said fourth lens component is a negative meniscus lens, said fifth lens component consists of a biconvex lens and a cemented biconvex doublet lens, said sixth lens component is a cemented biconcave lens and said eighth lens component is a positive meniscus lens, said lens system further satisfying the following conditions:

$d4 = 0.35 f$ $\nu_6 > \nu_7, \nu_8 > \nu_9$

3. A retrofocus-type ultra-wide angle photographic lens system according to claim 1 in which said first lens component is a positive meniscus lens, said fourth lens component is a negative meniscus lens, said fifth lens component consists of two biconvex lenses, said sixth lens component is a biconcave lens and said eighth lens component is a positive lens, said lens system further satisfying the following conditions:

$\nu_5 + \nu_6 + \nu_7 = 96.51$

4. A retrofocus-type ultra-wide angle photographic lens system according to claim 1 in which said first lens component is a positive meniscus lens, said fourth lens component consists of two negative meniscus lenses, said fifth lens component consists of a biconvex lens and a cemented biconvex doublet lens, said sixth lens component is a biconcave lens and said eighth lens component is a positive meniscus lens, said lens system further satisfying the following condition:

$\nu_8 + \nu_9 = 54$

5. A retrofocus-type ultra-wide angle photographic lens system according to claim 1 in which said first lens component consists of two positive meniscus lenses, said fourth lens component is a negative meniscus lens, said fifth lens component is a cemented biconvex doublet lens, said sixth lens component is a cemented biconcave doublet lens and said eighth lens component is a positive meniscus lens, said lens system further satisfying the following condition:

$\nu_6 > \nu_7, \nu_8 > \nu_9$

6. A retrofocus-type ultra-wide angle photographic lens system according to claim 1 in which said first lens component is a positive meniscus lens, said fourth lens component is a negative meniscus lens, said fifth lens component consists of a biconvex lens and a cemented biconvex doublet lens, said sixth lens component is a biconcave lens and said eighth lens component consists of two positive meniscus lenses, said lens system further satisfying the following condition:

$\nu_5 + \nu_8 = 64.64$

7. A retrofocus-type ultra-wide angle photographic lens system comprising a first lens component being a positive meniscus lens, a second lens component being a negative meniscus lens, a third lens component being a negative meniscus lens, a fourth lens component being a negative meniscus lens, a fifth lens component comprising a positive lens and cemented positive doublet lens, a sixth lens component being a cemented negative doublet lens, a seventh lens component being a positive meniscus lens and an eighth lens component being a positive meniscus lens, and said retrofocus-type ultra-wide angle photographic lens system having the following numerical values:

| | | | |
|---|---|---|---|
| $r_1 = 190.75$ | $d_1 = 24.59$ | $n_1 = 1.6779$ | $\nu_1 = 55.33$ |
| $r_2 = 338.60$ | $d_2 = 0.55$ | | |
| $r_3 = 166.61$ | $d_3 = 8.20$ | $n_2 = 1.7859$ | $\nu_2 = 44.24$ |
| $r_4 = 58.66$ | $d_4 = 35.08$ | | |
| $r_5 = 109.84$ | $d_5 = 8.20$ | $n_3 = 1.7859$ | $\nu_3 = 44.24$ |
| $r_6 = 58.41$ | $d_6 = 10.93$ | | |
| $r_7 = 107.90$ | $d_7 = 5.46$ | $n_4 = 1.7859$ | $\nu_4 = 44.24$ |
| $r_8 = 61.18$ | $d_8 = 10.93$ | | |
| $r_9 = 203.49$ | $d_9 = 20.55$ | $n_5 = 1.59551$ | $\nu_5 = 39.21$ |
| $r_{10} = -390.66$ | $d_{10} = 0.82$ | | |
| $r_{11} = 204.50$ | $d_{11} = 5.46$ | $n_6 = 1.6968$ | $\nu_6 = 55.62$ |

-continued $r_{12} = 48.75$
$r_{13} = 73.14$
$r_{14} = +31.43$
$r_{15} = 70.21$
$r_{16} = 326.17$
$r_{17} = 364.77$
$r_{18} = 78.24$
$r_{19} = 485.85$
$r_{20} = -116.31$ $d_{12} = 39.12$   $n_7 = 1.5927$   $\nu_7 = 35.54$
$d_{13} = 8.74$
$d_{14} = 39.34$   $n_8 = 1.8074$   $\nu_8 = 35.43$
$d_{15} = 5.46$    $n_9 = 1.84666$  $\nu_9 = 23.88$
$d_{16} = 4.37$
$d_{17} = 4.59$    $n_{10} = 1.618$ $\nu_{10} = 63.38$
$d_{18} = 0.82$
$d_{19} = 5.57$    $n_{11} = 1.618$ $\nu_{11} = 63.38$ $f = 100$
$f_B = 203.33$
$f_{1234} = -58.435$
$D_5 = 65.95$
$D_6 = 44.8$ wherein reference symbols $r_1$ through $r_{20}$ respectively represent radii of curvature of respective lens surfaces, reference symbols $d_1$ through $d_{19}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

8. A retrofocus-type ultra-wide angle photographic lens system comprising a first lens component being a positive meniscus lens, a second lens component being a negative meniscus lens, a third lens component being a negative meniscus lens, a fourth lens component being a negative meniscus lens, a fifth lens component comprising two positive lenses, a sixth lens component being a negative lens, a seventh lens component being a positive meniscus lens and an eighth lens component being a positive meniscus lens, and said retrofocus-type ultra-wide angle photographic lens system having the following numerical values:

$r_1 = 402.74$
$r_2 = 897.45$
$r_3 = 170.35$
$r_4 = 74.51$
$r_5 = 132.12$
$r_6 = 71.90$
$r_7 = 120.35$
$r_8 = 62.65$
$r_9 = 218.55$
$r_{10} = -278.53$
$r_{11} = 436.34$
$r_{12} = -99.36$
$r_{13} = -105.49$
$r_{14} = 242.14$
$r_{15} = 1535.19$
$r_{16} = -95.99$ $d_1 = 21.86$   $n_1 = 1.72$     $\nu_1 = 42.08$
$d_2 = 0.55$
$d_3 = 8.20$    $n_2 = 1.618$    $\nu_2 = 63.38$
$d_4 = 27.32$
$d_5 = 6.56$    $n_3 = 1.713$    $\nu_3 = 53.98$
$d_6 = 16.39$
$d_7 = 5.46$    $n_4 = 1.713$    $\nu_4 = 53.98$
$d_8 = 13.66$
$d_9 = 30$      $n_5 = 1.5927$   $\nu_5 = 35.54$
$d_{10} = 0.82$
$d_{11} = 56.01$ $n_6 = 1.5927$  $\nu_6 = 35.54$
$d_{12} = 8.74$
$d_{13} = 40.77$ $n_7 = 1.80518$ $\nu_7 = 25.43$
$d_{14} = 2.73$
$d_{15} = 9.13$ $n_8 = 1.618$    $\nu_8 = 63.38$
$d_{16} = 0.82$ $r_{17} = -852.91$
$r_{18} = -108.58$ $d_{17} = 15.57$  $n_9 = 1.64$   $\nu_9 = 60.25$ $f = 100$
$f_B = 202.18$
$f_{1234} = -69.38$
$D_5 = 86.83$
$D_6 = 40.77$ wherein reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_9$ respectively represent refractive indexes of respective lenses, reference symbols $\nu_1$ through $\nu_9$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

9. A retrofocus-type ultra-wide angle photographic lens system comprising a first lens component being a positive meniscus lens, a second lens component being a negative meniscus lens, a third lens component being a negative meniscus lens, a fourth lens component comprising two negative meniscus lenses, a fifth lens component comprising a positive lens and cemented positive doublet lens, a sixth lens component being a negative lens, a seventh lens component being a positive meniscus lens and an eighth lens component being a positive meniscus lens, and said retrofocus-type ultra-wide angle photographic lens system having the following numerical values:

$r_1 = 242.62$
$r_2 = 417.07$
$r_3 = 125.42$
$r_4 = 62.58$
$r_5 = 104.56$
$r_6 = 64.10$
$r_7 = 100.38$
$r_8 = 67.32$
$r_9 = 101.93$
$r_{10} = 69.36$
$r_{11} = 159.73$
$r_{12} = -348.08$
$r_{13} = 426.77$
$r_{14} = 47.22$
$r_{15} = -72.21$
$r_{16} = -111.52$
$r_{17} = 464.87$
$r_{18} = -278.28$
$r_{19} = -80.52$
$r_{20} = -533.62$
$r_{21} = -110.31$ $d_1 = 21.86$   $n_1 = 1.6935$   $\nu_1 = 50.81$
$d_2 = 0.55$
$d_3 = 8.20$    $n_2 = 1.64$     $\nu_2 = 60.25$
$d_4 = 22.79$
$d_5 = 8.20$    $n_3 = 1.67$     $\nu_3 = 57.33$
$d_6 = 11.38$
$d_7 = 8.20$    $n_4 = 1.713$    $\nu_4 = 53.89$
$d_8 = 9.95$
$d_9 = 5.47$    $n_5 = 1.713$    $\nu_5 = 53.89$
$d_{10} = 9.57$
$d_{11} = 23.39$ $n_6 = 1.69895$ $\nu_6 = 30.12$
$d_{12} = 0.82$
$d_{13} = 5.47$  $n_7 = 1.804$   $\nu_7 = 46.57$
$d_{14} = 45.11$ $n_8 = 1.62374$ $\nu_8 = 47.10$
$d_{15} = 8.75$
$d_{16} = 44.94$ $n_9 = 1.84666$ $\nu_9 = 23.88$
$d_{17} = 3.28$
$d_{18} = 14.59$ $n_{10} = 1.618$ $\nu_{10} = 63.38$
$d_{19} = 0.82$
$d_{20} = 15.58$ $n_{11} = 1.618$ $\nu_{11} = 63.38$ $f = 100$
$f_B = 202.175$
$f_{1234} = -66.709$
$D_5 = 75.79$ $D_6 = 44.94$ wherein reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

10. A retrofocus-type ultra-wide angle photographic lens system comprising a first lens component comprising two positive meniscus lenses, a second lens component being a negative meniscus lens, a third lens component being a negative meniscus lens, a fourth lens component being a negative meniscus lens, a fifth lens component being a positive cemented doublet lens, a sixth component being a negative cemented doublet lens, a seventh lens component being a positive meniscus lens and an eighth lens component being a positive meniscus lens, and said retrofocus-type ultra-wide angle photographic lens system having the following numerical values:

| | | | |
|---|---|---|---|
| $r_1 = 345.61$ | | | |
| | $d_1 = 17.48$ | $n_1 = 1.6935$ | $\nu_1 = 53.34$ |
| $r_2 = 381.0$ | | | |
| | $d_2 = 0.55$ | | |
| $r_3 = 202.12$ | | | |
| | $d_3 = 20.76$ | $n_2 = 1.64$ | $\nu_2 = 60.25$ |
| $r_4 = 372.24$ | | | |
| | $d_4 = 0.55$ | | |
| $r_5 = 112.77$ | | | |
| | $d_5 = 8.20$ | $n_3 = 1.804$ | $\nu_3 = 46.57$ |
| $r_6 = 51.04$ | | | |
| | $d_6 = 21.66$ | | |
| $r_7 = 94.28$ | | | |
| | $d_7 = 8.20$ | $n_4 = 1.804$ | $\nu_4 = 46.57$ |
| $r_8 = 60.69$ | | | |
| | $d_8 = 11.11$ | | |
| $r_9 = 81.57$ | | | |
| | $d_9 = 5.46$ | $n_5 = 1.804$ | $\nu_5 = 46.57$ |
| $r_{10} = 54.67$ | | | |
| | $d_{10} = 8.20$ | | |
| $r_{11} = 115.82$ | | | |
| | $d_{11} = 5.46$ | $n_6 = 1.804$ | $\nu_6 = 46.57$ |
| $r_{12} = 50.12$ | | | |
| | $d_{12} = 61.12$ | $n_7 = 1.5927$ | $\nu_7 = 35.54$ |
| $r_{13} = -74.21$ | | | |
| | $d_{13} = 8.74$ | | |
| $r_{14} = -202.01$ | | | |
| | $d_{14} = 37.76$ | $n_8 = 1.804$ | $\nu_8 = 46.57$ |
| $r_{15} = -92.86$ | | | |
| | $d_{15} = 5.46$ | $n_9 = 1.80518$ | $\nu_9 = 25.43$ |
| $r_{16} = 400.39$ | | | |
| | $d_{16} = 3.28$ | | |
| $r_{17} = -232.64$ | | | |
| | $d_{17} = 14.59$ | $n_{10} = 1.618$ | $\nu_{10} = 63.38$ |
| $r_{18} = -75.14$ | | | |
| | $d_{18} = 0.82$ | | |
| $r_{19} = -705.46$ | | | |
| | $d_{19} = 15.57$ | $n_{11} = 1.618$ | $\nu_{11} = 63.38$ |
| $r_{20} = -133.68$ | | | |

$f = 100$
$f_B = 202.16$
$f_{1234} = -63.166$
$D_5 = 66.58$
$D_6 = 43.22$ wherein reference symbols $r_1$ through $r_{20}$ respectively represent radii of curvature of respective lens surfaces, reference symbols $d_1$ through $d_{19}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represent the total focal length of the first through fourth lens components.

11. A retrofocus-type ultra-wide angle photographic lens system comprising a first lens component being a positive meniscus lens, a second lens component being a negative meniscus lens, a third lens component being a negative meniscus lens, a fourth lens component being a negative meniscus lens, a fifth lens component comprising a positive lens and positive cemented doublet lens, a sixth lens component being a negative lens, a seventh lens component being a positive meniscus lens and an eighth lens component comprising two positive meniscus lenses, and said retrofocus-type ultra-wide angle photographic lens system having the following numerical values:

| | | | |
|---|---|---|---|
| $r_1 = 178.76$ | | | |
| | $d_1 = 21.74$ | $n_1 = 1.804$ | $\nu_1 = 46.57$ |
| $r_2 = 328.51$ | | | |
| | $d_2 = 0.54$ | | |
| $r_3 = 146.17$ | | | |
| | $d_3 = 8.15$ | $n_2 = 1.713$ | $\nu_2 = 53.89$ |
| $r_4 = 60.03$ | | | |
| | $d_4 = 40.06$ | | |
| $r_5 = 109.36$ | | | |
| | $d_5 = 8.15$ | $n_3 = 1.713$ | $\nu_3 = 53.89$ |
| $r_6 = 56.62$ | | | |
| | $d_6 = 8.23$ | | |
| $r_7 = 116.18$ | | | |
| | $d_7 = 5.43$ | $n_4 = 1.713$ | $\nu_4 = 53.89$ |
| $r_8 = 56.14$ | | | |
| | $d_8 = 6.80$ | | |
| $r_9 = 160.99$ | | | |
| | $d_9 = 21.24$ | $n_5 = 1.59551$ | $\nu_5 = 39.21$ |
| $r_{10} = -407.21$ | | | |
| | $d_{10} = 0.82$ | | |
| $r_{11} = 230.55$ | | | |
| | $d_{11} = 5.43$ | $n_6 = 1.804$ | $\nu_6 = 46.57$ |
| $r_{12} = 62.57$ | | | |
| | $d_{12} = 42.45$ | $n_7 = 1.61659$ | $\nu_7 = 36.63$ |
| $r_{13} = -71.94$ | | | |
| | $d_{13} = 8.70$ | | |
| $r_{14} = -130.41$ | | | |
| | $d_{14} = 37.34$ | $n_8 = 1.80518$ | $\nu_8 = 25.43$ |
| $r_{15} = 323.41$ | | | |
| | $d_{15} = 3.26$ | | |
| $r_{16} = -270.88$ | | | |
| | $d_{16} = 12.50$ | $n_9 = 1.48606$ | $\nu_9 = 81.49$ |
| $r_{17} = -73.41$ | | | |
| | $d_{17} = 0.82$ | | |
| $r_{18} = -292.45$ | | | |
| | $d_{18} = 14.13$ | $n_{10} = 1.48606$ | $\nu_{10} = 81.49$ |
| $r_{19} = -108.62$ | | | |
| | $d_{19} = 0.82$ | | |
| $r_{20} = -254.89$ | | | |
| | $d_{20} = 15.49$ | $n_{11} = 1.48606$ | $\nu_{11} = 81.49$ |
| $r_{21} = -110.77$ | | | |

$f = 100$
$f_B = 202.23$
$f_{1234} = -55.406$
$D_5 = 69.94$
$D_6 = 37.34$ wherein reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indexes of respective lenses, reference symbols $\nu_1$ through $\nu_{11}$ respectively represent Abbe's numbers of respective lenses, reference symbol $f$ represents the focal length of the lens system as a whole, reference symbol $f_B$ represents the back focal length, and reference symbol $f_{1234}$ represents the total focal length of the first through fourth lens components.

* * * * *